United States Patent
Kim et al.

(10) Patent No.: US 8,606,337 B2
(45) Date of Patent: Dec. 10, 2013

(54) METHOD TO CONTROL SLEEP MODE, AND TERMINAL AND APPARATUS THEREOF

(75) Inventors: Eunkyung Kim, Seoul (KR); Namsuk Lee, Daejeon (KR); Kyung Soo Kim, Daejeon (KR)

(73) Assignees: Samsung Electronics Co., Ltd., Suwon-si (KR); Electronics and Telecommunications Research Institute, Daejeon (KR)

( * ) Notice: Subject to any disclaimer, the term of this patent is extended or adjusted under 35 U.S.C. 154(b) by 271 days.

(21) Appl. No.: 13/003,229

(22) PCT Filed: Jul. 7, 2009

(86) PCT No.: PCT/KR2009/003689
§ 371 (c)(1),
(2), (4) Date: Jan. 7, 2011

(87) PCT Pub. No.: WO2010/005219
PCT Pub. Date: Jan. 14, 2010

(65) Prior Publication Data
US 2011/0138209 A1 Jun. 9, 2011

(30) Foreign Application Priority Data

Jul. 7, 2008 (KR) .................. 10-2008-0065589
Jul. 1, 2009 (KR) .................. 10-2009-0059921

(51) Int. Cl.
*H04M 1/00* (2006.01)
*H04B 1/38* (2006.01)

(52) U.S. Cl.
USPC ......................................... 455/574; 370/311

(58) Field of Classification Search
USPC ......... 455/550.1, 574, 522; 370/310, 311, 318
See application file for complete search history.

(56) References Cited

U.S. PATENT DOCUMENTS

| | | | |
|---|---|---|---|
| 6,622,251 B1 * | 9/2003 | Lindskog et al. | 713/300 |
| 7,573,841 B2 * | 8/2009 | Lee et al. | 370/311 |
| 7,630,702 B2 * | 12/2009 | Kim et al. | 455/343.4 |
| 2006/0009267 A1 | 1/2006 | Lee et al. | |
| 2007/0242786 A1 | 10/2007 | Kim et al. | |
| 2007/0274244 A1 | 11/2007 | Yoon et al. | |
| 2008/0031173 A1 * | 2/2008 | Zhang et al. | 370/311 |
| 2008/0043656 A1 * | 2/2008 | Yoon et al. | 370/311 |
| 2008/0095092 A1 * | 4/2008 | Kim | 370/311 |
| 2009/0201842 A1 * | 8/2009 | Guan | 370/310 |

FOREIGN PATENT DOCUMENTS

| | | |
|---|---|---|
| CN | 1998162 | 7/2007 |
| EP | 1 511 336 A2 | 3/2005 |
| EP | 1 545 052 A1 | 6/2005 |
| EP | 0 796 025 A2 | 9/2007 |

(Continued)

OTHER PUBLICATIONS

Notification of Transmittal of the International Search Report and Written Opinion of the International Searching Authority, dated Dec. 15, 2010 in connection with PCT Patent Application No. PCT/KR2009/003689.

(Continued)

*Primary Examiner* — Ajit Patel

(57) ABSTRACT

During a listening window after a sleep window, a terminal receives a control signal that indicates existence of data corresponding to the terminal, and enters a sleep window if no data corresponding to the terminal exists.

6 Claims, 2 Drawing Sheets

(56) References Cited

FOREIGN PATENT DOCUMENTS

| EP | 1 892 968 A1 | 2/2008 |
|---|---|---|
| KR | 10-2005-0116076 | 12/2005 |
| KR | 10-2006-0016427 | 2/2006 |
| KR | 10-2006-0040063 | 5/2006 |
| KR | 10-0657507 | 12/2006 |
| WO | WO 96/19084 | 6/1996 |
| WO | WO 2005/008359 A2 | 1/2005 |
| WO | WO 2005/125055 A1 | 12/2005 |
| WO | WO 2006/036047 A2 | 4/2006 |

OTHER PUBLICATIONS

Kim, E. et al.: "Group Sleep Mode in IEEE 802.16m", IEEE 802.16 Broadband Wireless Access Working Group, IEEE C802.16m 08/591 [online], Jul. 7, 2008, 12 pages.

Chinese Office Action dated Apr. 1, 2013 in connection with Chinese Application No. 200980126334.0, 26 pages.

* cited by examiner

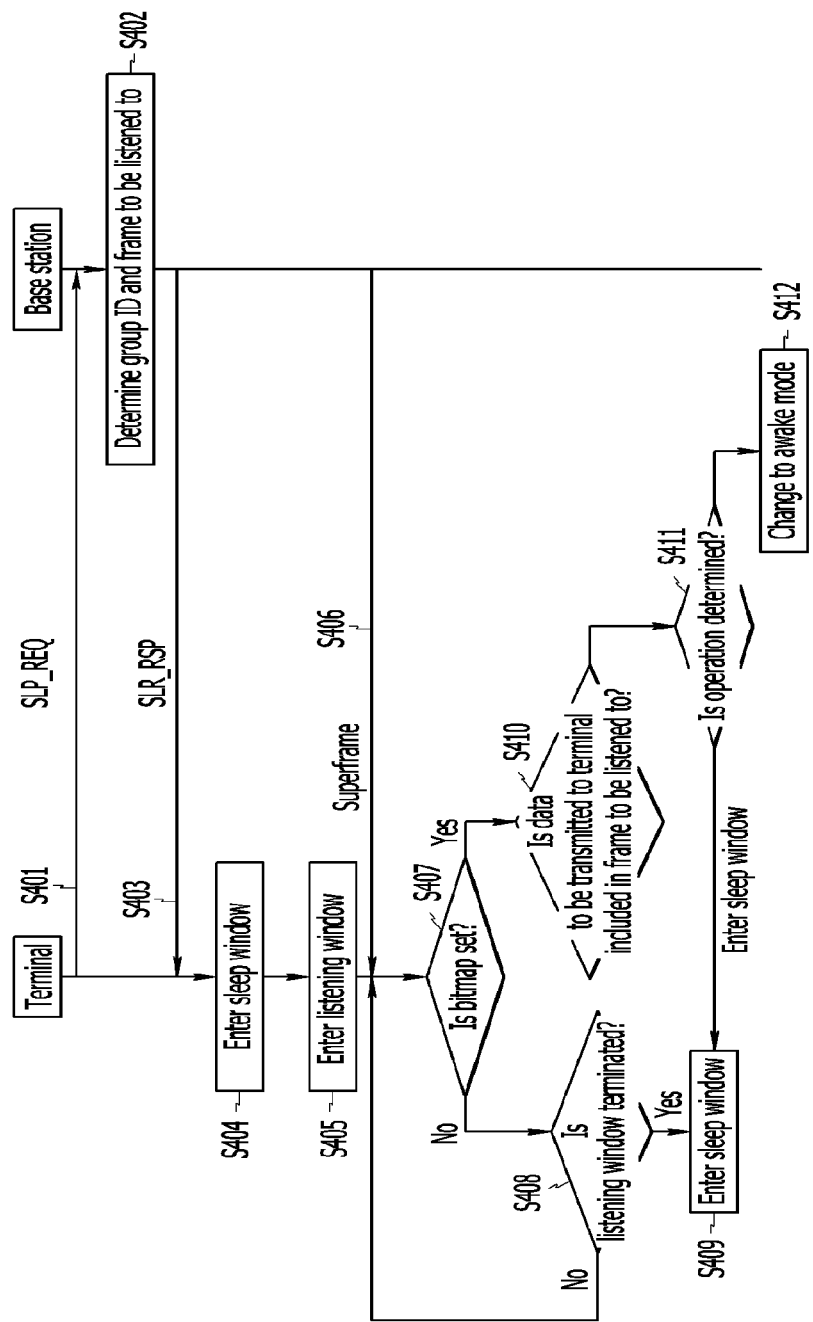

METHOD TO CONTROL SLEEP MODE, AND TERMINAL AND APPARATUS THEREOF

CROSS-REFERENCE TO RELATED APPLICATION(S)

The present application claims priority under 35 U.S.C. §365 to International Patent Application No. PCT/KR2009/003689 filed Jul. 7, 2009, entitled "METHOD TO CONTROL SLEEP MODE, AND TERMINAL AND APPARATUS THEREOF". International Patent Application No. PCT/KR2009/003689 claims priority under 35 U.S.C. §365 and/or 35 U.S.C. §119(a) to Korean Patent Application No. 10-2008-0065589 filed Jul. 7, 2008 and Korean Patent Application No. 10-2009-0059921 filed Jul. 1, 2009, and which are incorporated herein by reference into the present disclosure as if fully set forth herein.

TECHNICAL FIELD

The present invention relates to a sleep mode management method.

BACKGROUND ART

A wireless communication system supports a sleep mode for minimizing power consumption of a terminal, and a terminal in the sleep mode repeats a sleep window and a listening window.

During the sleep window, the terminal saves power by not performing operation for data receiving. During the listening window, the terminal receives a message that informs generation of downlink traffic to be transmitted to the terminal during the sleep window from a base station, and when the downlink traffic is generated, the terminal terminates the sleep mode and changes to an awake mode to receive the downlink traffic from the base station.

The sleep mode is performed between a base station and each terminal. That is, the base station transmits a message that informs generation of downlink traffic to a corresponding terminal for each terminal in a sleep mode.

Since the base station transmits a message indicating generation of downlink traffic to each of terminals having similar sleep and listening windows, system overhead is increased and performance is deteriorated.

The above information disclosed in this Background section is only for enhancement of understanding of the background of the invention and therefore it may contain information that does not form the prior art that is already known in this country to a person of ordinary skill in the art.

DISCLOSURE OF INVENTION

Technical Problem

The present invention has been made in an effort to provide a sleep mode management method for managing terminals having similar sleep and listening windows in a group, a terminal, and a sleep mode managing apparatus.

Solution to Problem

According to an exemplary embodiment of the present invention, a sleep mode management method is provided.

The sleep mode management method according to the exemplary embodiment of the present invention includes: operating in a sleep window; and receiving a control signal that indicates whether data corresponding to the terminal exists during a listening window after the sleep window.

According to another exemplary embodiment of the present invention, a method for managing a sleep mode of a terminal is provided to a sleep mode managing apparatus of a base station. The sleep mode management method according to the other exemplary embodiment of the present invention includes: negotiating a parameter of the sleep mode with the terminal; and transmitting a control signal that indicates whether data of the terminal exists to a terminal in the sleep mode.

According to another exemplary embodiment of the present invention, a terminal managing a sleep mode is provided.

The terminal managing the sleep mode includes: a sleep window operation unit that operates in a sleep window; and a listening window operation unit that receives a control signal that indicates whether data corresponding to the terminal exists from a base station during a listening window after the sleep window, and enters a sleep window if data of the terminal does not exist in the control signal.

According to another exemplary embodiment of the present invention, a sleep mode managing apparatus that manages a sleep mode of a terminal is provided.

The sleep mode managing apparatus includes: a determining unit that determines a parameter of a sleep mode of the terminal; and a transmitting/receiving unit that transmits a control signal that indicates existence of data corresponding to the terminal to the terminal.

Advantageous Effects of Invention

According to the exemplary embodiments of the present invention, a sleep mode management method for managing terminals having similar sleep and listening windows in a group, a terminal, and a sleep mode managing apparatus are provided to thereby decrease system overhead and improve system performance.

BRIEF DESCRIPTION OF DRAWINGS

FIG. 4 is a flowchart of a sleep mode management method according to an exemplary embodiment of the present invention.

BEST MODE FOR CARRYING OUT THE INVENTION

Figure 1:
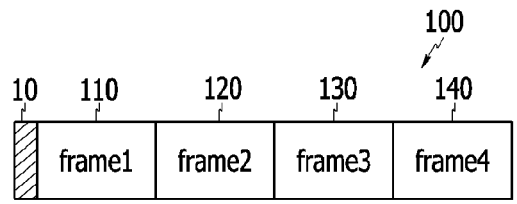
FIG. 1 shows a superframe according to an exemplary embodiment of the present invention.
Figure 1:
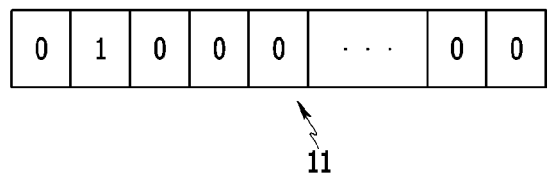

In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

In addition, unless explicitly described to the contrary, the word "comprise" and variations such as "comprises" or "comprising" will be understood to imply the inclusion of stated elements but not the exclusion of any other elements.

Hereinafter, a sleep mode management method, a terminal, and a sleep mode managing apparatus according to an exemplary embodiment of the present invention will be described in further detail.

A terminal according to an exemplary embodiment of the present invention receives a group identifier (ID) to which the terminal is included and a frame to be listened to by the terminal in a superframe from a base station so as to enter a sleep mode. When the terminal enters a listening window after termination of a sleep window, the terminal receives a superframe from the base station.

FIG. 1 shows a superframe according to an exemplary embodiment of the present invention.

A superframe 100 includes a plurality of frames, for example, four frames, which are a frame1 110, a frame2 120, a frame3 130, and a frame4 140. In addition, the superframe 100 includes a superframe header 10, and the superframe header 10 may be located at the beginning of the superframe 100, that is, at the beginning of the first frame1 110.

The base station may transmit a control signal through the superframe 100 to at least one terminal, and the control signal may have a positive or negative value for data to be transmitted to the corresponding data.

The control signal may include a bitmap 11 for designating a plurality of group IDs.

That is, a plurality of terminals within a coverage area of the base station are grouped into a plurality of groups, and each group may include at least one terminal and may be allocated with a corresponding group ID.

Then, among a plurality of bits of the bitmap 11, the base station may set a bit corresponding to a group ID to which a terminal to be receiving data to a positive value (i.e., 1) and other bits to a negative value (i.e., 0).

For example, when the bitmap 11 is an n-bit bitmap, a bitmap 11 having a value of "100 . . . 00" implies that data to be transmitted to a terminal corresponding to the first group ID exists, a bitmap 11 having a value of "1010 . . . 00" implies that data to be transmitted to terminals corresponding to the first and third group IDs exist, and a bitmap 11 having a value of "0100 . . . 01" implies that data to be transmitted to terminals corresponding to the second and n-th group IDs exist.

In addition, the superframe includes a control signal field having the control signal, and the control signal field may be included in a superframe header or may be included in a predetermined location in the superframe.

Figure 2:
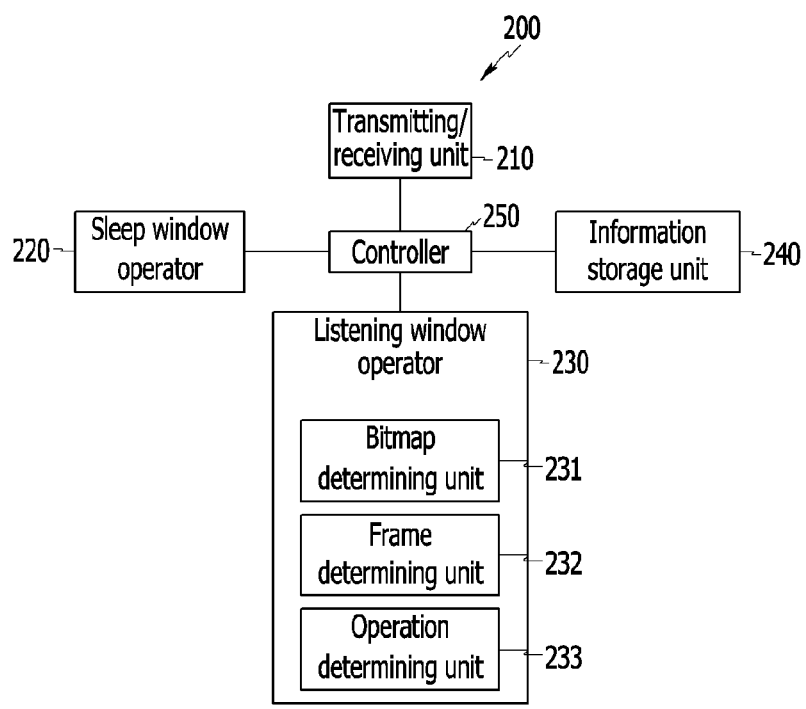
FIG. 2 shows a terminal according to the exemplary embodiment of the present invention.

FIG. 2 shows a terminal according to an exemplary embodiment of the present invention.

Referring to FIG. 2, a terminal 200 according to an exemplary embodiment of the present invention includes a transmitting/receiving unit 210, a sleep window operator 220, a listening window operator 230, an information storage unit 240, and a controller 250.

The transmitting/receiving unit 210 transmits a sleep mode request (SLP_REQ) message to a base station and receives a sleep mode response (SLP_RSP) message from the base station. In addition, the transmitting/receiving unit 210 receives a superframe from the base station during a listening window.

The sleep window operator 220 controls the terminal 200 to not perform any operation for data receiving from a sleep mode start frame during a sleep window based on information stored in the information storage unit 240.

The listening window operator 230 includes a bitmap determining unit 231, a frame determining unit 232, and an operation determining unit 233, and determines operation after the listening window based on data included in the superframe received from the base station during the listening window.

The bitmap determining unit 231 determines whether a bit corresponding to a group ID to which the terminal 200 is included in the bitmap 11 of the superframe 100 has a positive value (i.e., 1). When the bit corresponding to the group ID to which the terminal 200 is included has the positive value, the received superframe 100 includes data to be transmitted to a terminal corresponding to the group ID to which the terminal 200 is included.

When it is determined that the bit corresponding to the group ID of the terminal 200 has the positive value by the bitmap determining unit 231, the frame determining unit 232 determines whether a frame to be listened to by the terminal 200 includes data to be transmitted to the terminal 200.

The bitmap 11 has information on whether the superframe 100 includes data of the group ID to which the terminal 200 is included, and therefore, it is substantially required to determine whether data of the terminal 200 is included in the frame.

The operation determining unit 233 determines whether to enter a sleep window or to terminate a sleep mode and change to an awake mode.

In further detail, if the bitmap determining unit 231 determines that the bit corresponding to the group ID of the terminal 200 has a negative value (i.e., 0), the operation determining unit 233 determines to enter the sleep window.

Although the bitmap determining unit 231 determines that the bit corresponding to the group ID of the terminal 200 has the positive value (1), the operation determining unit 233 determines to enter the sleep window if the frame determining unit 232 determines that the frame to be listened to by the terminal 200 does not include data to be transmitted to the terminal 200.

However, if the bitmap determining unit 231 determines that the bit corresponding to the group ID of the terminal 200 has the positive value and the frame determining unit 232 determines that the frame to be listened to by the terminal 200 includes data to be transmitted to the terminal 200, the operation determining unit 233 determines whether to enter the sleep window or to change to the awake mode after a listening window based on contents of the data included in the frame to be listened to by the terminal 200.

The information storage unit 240 stores information included in the SLR_RSP message received from the base station. In further detail, the information storage unit 240 stores a sleep mode start frame, the minimum sleep window, the maximum sleep window, a listening window, a group ID to which the terminal 200 is included, and a frame to be listened to by the terminal 200.

The controller 250 controls operations of the transmitting/receiving unit 210, the sleep window operator 220, and the listening window operator 230.

Figure 3:
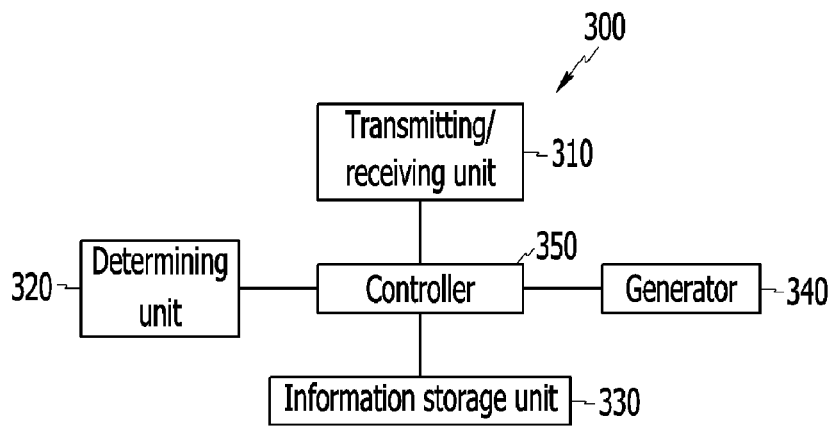
FIG. 3 shows a sleep mode managing apparatus of a base station according to the exemplary embodiment of the present invention.

FIG. 3 shows a sleep mode managing apparatus of a base station according to an exemplary embodiment of the present invention.

Referring to FIG. 3, a sleep mode managing apparatus 300 according to an exemplary embodiment of the present invention includes a transmitting/receiving unit 310, a determining unit 320, a generator 330, an information storage unit 340, and a controller 350.

The transmitting/receiving unit 310 receives a sleep mode request (SLP_REQ) message from a terminal 200 and transmits a sleep mode response (SLP_RSP) message to the terminal 200.

The determining unit 320 determines a group ID to which the terminal 200 is to be included and a frame to be listened to by the terminal 200 in a superframe based on contents included in the SLP_REQ message. In this case, the determining unit 320 may allocate the same group ID to terminals having similar duration of sleep and listening windows.

The generator 330 generates a superframe based on whether downlink traffic is generated during a sleep window of a terminal in a sleep mode in a base station coverage area.

In further detail, when the downlink traffic is generated during the sleep window of the terminal 200, the generator 330 stores data of the terminal 200 in a frame to be listened to by the terminal 200, generates a bitmap 11 having a bit that corresponds to a group ID of the terminal 200 to a positive value (i.e., 1), and generates a superframe including the generated bitmap 11.

In this case, the data stored in the frame to be listened to by the terminal 200 may be contents of "change to awake mode and receive downlink traffic" since downlink to be transmitted to the terminal 200 from the base station 300 exists, or may be "downlink traffic" to be received during the listening window from the base station 300.

The information storage unit 340 stores a group of each terminal included in a base station 300 and operating in a sleep mode, a frame to be listened to, a sleep mode start frame, a minimum sleep window, a maximum sleep window, and a listening window.

The controller 350 controls operations of the transmitting/receiving unit 310, the determining unit 320, and the generator 330.

A sleep mode management method according to an exemplary embodiment of the present invention will now be described in further detail.

FIG. 4 is a flowchart of a sleep mode management method according to an exemplary embodiment of the present invention.

Referring to FIG. 4, a base station 300 and a terminal 200 negotiate a parameter for a sleep mode (S401, S402, and S403).

In further detail, a terminal 200 to be operated in a sleep mode transmits a sleep mode request (SLP-REQ) message to the base station 300 (S401). In this case, the SLP_REQ message may include a minimum sleep window (Min-sleep-window=N1), a maximum sleep window (Max-sleep-window=N2), and a listening window (listening window=L1).

Upon arrival of the SLP_REQ message, the base station 300 determines a group ID to which the terminal 200 is included and a frame to be listened to by the terminal 200 in a superframe based on contents included in the SLP_REQ message (S402).

The base station 300 transmits a sleep mode response (SLP_RSP) message to the terminal 200 (S403). In this case, the SLP_RSP message includes parameters of a sleep mode start frame (Start frame=M), a minimum sleep window (Min-sleep-window=N1), a maximum sleep window (Max-sleep-window=N2), a listening window (listening window=L1), a group ID (Group ID=ID2) to which the terminal 200 is included, and a frame (listening Frame=F3) to be listened to by the terminal 200 in the superframe.

Upon arrival of the SLP_RSP message, the terminal 200 enters a sleep window and the terminal 200 does not receive data from a sleep mode start frame M to the minimum sleep window N1 (S404).

When the sleep window is terminated and the terminal 200 enters a listening window (S405), the terminal 200 receives a superframe from the base station 300 (S406). The terminal 200 received by the superframe determines whether a control signal that indicates data to be transmitted to the terminal 200 exists in a control signal field in the superframe. That is, the terminal 200 determines existence of a control signal that is positive thereto in the control signal field.

For this, the terminal 200 determines whether a value corresponding to a group ID of the terminal 200 is set in the bitmap 11 of the control signal (S407). For example, in the case that the terminal 200 is included in the second group ID2, the terminal 200 determines that the superframe 100 includes data of a group to which the terminal 200 is included if the second bit of the bitmap 11 is set to "1".

If a bitmap 11 corresponding to a group ID of the terminal 200 is not set in a superframe received from the base station 300, the terminal 200 determines whether the listening window is terminated (S408) and enters a sleep window if the listening window is terminated (S409). In this case, the sleep window may be equal to or longer than the previous sleep window N1 within a range that is shorter than the maximum sleep window N2.

If a bitmap 11 corresponding to the group ID of the terminal 200 is set in the superframe received from the base station 300, the terminal 200 awakes at a portion corresponding to a frame F3 to be listened to by the terminal 200 in the superframe and determines whether the frame F3 includes data to be transmitted to the terminal 200 (S410).

If the frame F3 does not include data to be transmitted to the terminal 200 and the listening window is terminated (S408), the terminal 200 enters the sleep window (S409).

If the frame F3 includes data to be transmitted to the terminal 200, the terminal 200 determines whether to enter the next sleep window or to terminate the sleep mode and change into an awake mode based on contents included in the frame F3 (S411 and S412). The terminal 200 performs the determined operation.

According to the exemplary embodiment of the present invention, the base station 300 manages terminals having similar duration of sleep and listening windows with the same group ID so that system overhead can be reduced and performance can be improved.

In addition, according to the exemplary embodiment of the present invention, the terminal 200 checks data included in a frame to be listened to by the terminal 200 only when data corresponds to a group to which the terminal 200 is included is included in the superframe during a listening window.

Therefore, there is no need to check contents of the superframe if no data of a group to which the terminal 200 is included is provided, and if data of the group to which the terminal 200 is included is provided, data included in only a frame to be listened to by the terminal 200 is checked rather than checking a plurality of frames included in the superframe.

The above-described embodiments can be realized through a program for realizing functions corresponding to the configuration of the embodiments or a recording medium for recording the program in addition to through the above-described device and/or method, which is easily realized by a person skilled in the art.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

The invention claimed is:

1. A method for managing a sleep mode in a terminal, the method comprising:

negotiating a parameter of the sleep mode with a base station;

operating in a sleep window;

receiving a control signal that indicates whether data corresponding to a group identifier (ID) to which the terminal belongs exists during a listening window after the sleep window;

entering into the sleep window when the control signal indicates that no data corresponding to the group ID exists, wherein the control signal includes a bitmap having a plurality of bits for designating a plurality of group identifiers (IDs), wherein the parameter includes the group ID to which the terminal belongs among the group IDs and a frame number in which data are to be listened, and wherein the control signal indicates whether the data exists or not by setting a value of a bit corresponding to the group ID among the plurality of bits;

when the data corresponding to the group ID to which the terminal belongs exists, awaking at a frame corresponding to the frame number and determining whether the frame includes data being transmitted to the terminal; and when the frame includes the data to be transmitted to the terminal, determining whether to enter a sleep window or to terminate the sleep mode and change to an awake mode based on the data to be transmitted to the terminal.

2. The method of claim 1, wherein the entering into the sleep window comprises:

determining whether the listening window is terminated; and entering into the sleep window if the listening window is terminated.

3. The method of claim 1, wherein the bit corresponding to the group ID to which the terminal belongs is set to '1' when the data corresponding to the group ID exists.

4. A terminal for managing a sleep mode, the terminal comprising:

a transmitting/receiving unit configured to negotiate a parameter of the sleep mode with a base station;

a sleep window operation unit configured to operate in a sleep window;

a listening window operation unit configured to receive a control signal that indicates whether data corresponding to a group identifier (ID) to which the terminal belongs exists from the base station during a listening window after the sleep window, and enter the sleep window when the control signal indicates that the data for the terminal does not exist, wherein the control signal includes a bitmap having a plurality of bits for designating a plurality of group identifiers (IDs), wherein the parameter includes the group ID to which the terminal belongs among the group IDs and a frame number in which data are to be listened, and wherein the control signal indicates whether the data exists or not by setting a value of a bit corresponding to the group ID among the plurality of bits, the listening window operation unit being further configured to, when the data corresponding to the group ID to which the terminal belongs exists, awake at a frame corresponding to the frame number and determine whether the frame includes data to be transmitted to the terminal; and an operation determining unit configured to determine whether to enter the sleep window or to terminate the sleep mode and change to an awake mode based on the data being transmitted to the terminal when the frame includes the data being transmitted to the terminal.

5. The terminal of claim 4, wherein the bit corresponding to the group ID to which the terminal belongs is set to '1' when data corresponding to the group ID exists.

6. The terminal of claim 4, wherein the listening window operation unit comprises:

a bitmap determining unit configured to determine whether the bit corresponding to the group ID is set in the control signal; and a frame determining unit configured to determine whether data for the terminal are included in the frame number when the bit corresponding to the group ID is set to '1'.

* * * * *